(12) United States Patent
Kemppainen

(10) Patent No.: US 7,942,044 B2
(45) Date of Patent: May 17, 2011

(54) WRIST PIN SENSING SYSTEM AND METHOD

(75) Inventor: Daniel R. Kemppainen, Calumet, MI (US)

(73) Assignee: Michigan Technological University, Houghton, MI (US)

( * ) Notice: Subject to any disclaimer, the term of this patent is extended or adjusted under 35 U.S.C. 154(b) by 737 days.

(21) Appl. No.: 11/959,259

(22) Filed: Dec. 18, 2007

(65) Prior Publication Data

US 2009/0151438 A1    Jun. 18, 2009

(51) Int. Cl.
*G01M 15/06*    (2006.01)
(52) U.S. Cl. .................... 73/114.77; 73/115.01
(58) Field of Classification Search ............. 73/114.77, 73/115.01
See application file for complete search history.

(56) References Cited

U.S. PATENT DOCUMENTS

| | | | | |
|---|---|---|---|---|
| 4,235,101 A | * | 11/1980 | Stadelmann | 73/114.63 |
| 4,527,522 A | * | 7/1985 | Cerny | 123/406.62 |
| 4,951,639 A | * | 8/1990 | Iwata et al. | 123/613 |
| 5,042,021 A | * | 8/1991 | Nagano et al. | 369/44.32 |
| 5,052,358 A | * | 10/1991 | Fukui | 73/114.27 |
| 5,056,485 A | * | 10/1991 | Kobayashi et al. | 123/406.53 |
| 5,114,230 A | * | 5/1992 | Pryor | 356/625 |
| 5,115,792 A | * | 5/1992 | Fukui | 123/613 |
| 5,276,323 A | * | 1/1994 | Nakaho | 250/231.13 |
| 5,486,925 A | * | 1/1996 | Sano et al. | 356/616 |
| 5,663,794 A | * | 9/1997 | Ishizuka | 356/499 |
| 6,305,353 B1 | * | 10/2001 | Weber et al. | 123/406.58 |
| 7,348,545 B2 | * | 3/2008 | Yeoh et al. | 250/231.13 |
| 7,379,800 B2 | * | 5/2008 | Breed | 701/29 |
| 7,595,480 B2 | * | 9/2009 | Kress | 250/231.13 |

* cited by examiner

*Primary Examiner* — Freddie Kirkland, III
(74) *Attorney, Agent, or Firm* — Michael Best & Friedrich LLP

(57) ABSTRACT

A method, and a system employing the method, for determining a position of a rotational part in a reciprocating machine. The system includes a quadrature encoder and an interrupter coupled to the rotational element. As the interrupter rotates with the wrist pin, the quadrature encoder generates some binary signals based on the rotation of the wrist pin. A digital-to-analog converter then converts the binary signals into a single analog signal. The system then wirelessly transmits the single analog signal for processing by other remote components.

19 Claims, 5 Drawing Sheets

WRIST PIN SENSING SYSTEM AND METHOD

BACKGROUND

Embodiments of the invention relate to rotational element, position-sensing systems.

In an engine, a wrist pin generally connects a connecting rod to a piston to convert reciprocal movement of the piston into a rotational movement of a crankshaft. Typically, wrist pins and connecting rods are made with different materials having different thermal growths, which may result in wrist pin failure. When a wrist pin fails or seizes, other engine failures such as engine stall follow.

SUMMARY

The invention provides a method and system to monitor a position of a rotational element in an engine environment. When rotational parameters of a rotational element such as a wrist pin are monitored, other engine problems may be minimized. In one embodiment, the invention provides a monitoring system for monitoring a position of a wrist pin. The system includes a quadrature encoder, an interrupter, a resistor ladder network, and a transmission circuit positioned at an end of the wrist pin. The encoder includes at least two emitters on one side of the interrupter, and at two sensors on an opposite side of the interrupter. The two sensors receive signals that are not interrupted by the interrupter. Based on the received signals, the encoder generates two binary signals. The resistor ladder network translates the two binary signals into a single analog signal. The transmission circuit then wirelessly transmits the single analog signal for processing externally. Once wirelessly received externally, an external processor converts the received analog signal into wrist pin directions and speeds.

In another embodiment, the invention provides a reciprocating machine that includes a crank case, a crankshaft that is supported for rotation within the crank case, and a cylinder that defines a bore. The reciprocating machine also includes a piston that reciprocates within the bore of the cylinder, and has at least one bearing surface. The reciprocating machine also includes a wrist pin that is supported by the at least one bearing surface, a connecting rod that has a first end that is pivotally connected to the crankshaft and a second end that is pivotally connected to the wrist pin to convert reciprocal movement of the piston into rotation movement of the crankshaft, and a rotational element that has alternating slits and solid portions. The rotational element is coupled to the wrist pin.

The reciprocating machine also includes a first binary signal generator that includes a first optical signal generator and a first optical signal receiver. The first optical signal generator is on one side of the rotational element, and the first optical signal receiver is on an opposite side of the rotational element and is aligned with the first optical signal generator. In this way, the first binary signal generator can generate a first binary signal in response to respective slits and solids or solid portions of the rotational element positioned between the first optical signal generator and the first optical signal receiver. The first binary signal generator is decoupled from rotational movement with the wrist pin.

The reciprocating machine also includes a second binary signal generator that includes a second optical signal generator on one side of the rotational element and a second optical signal receiver on an opposite side of the rotational element. The second optical signal is aligned with the second optical signal generator, such that the second binary signal generator can generate a second binary signal that in response to respective slits and solid or solid portions of the rotational element positioned between the second optical signal generator and the second optical signal receiver. The second binary signal generator is decoupled from rotational movement with the wrist pin. The reciprocating machine also includes a circuit that receives the first and second binary signals and converts the first and second binary signals into a single analog signal.

In another embodiment, the invention also provides a method for determining a position of a rotational element having alternating slits and solids. The method includes generating a first optical signal at a first position on one side of the rotational element, and receiving at least a portion of the first optical signal at a first position on an opposite side of the rotational element in response to the respective slits and solids of the rotational element. The method also includes generating a first binary signal having high or low values in response to the received first signal, and generating a second optical signal at a second position on the one side of the rotational element. The method also includes receiving at least a portion of the second optical signal at a second position on the opposite side of the rotational element in response to the respective slits and solid or solid portions of the rotational element, generating a second binary signal having high or low values in response to the received second signal, and converting the first and second binary signals into a single analog signal.

In another embodiment, the invention also provides a method for sensing a position of a wrist pin rotationally coupled to a rotational element having a plurality of apertures. The method includes emitting first and second signals from one side of the rotational element, and receiving at least a portion of the respective first and second signals through the apertures on an opposite side of the rotational element. The method also includes generating respective first and second binary signals having high or low values in response to the received first and second signals, and generating a single analog signal in response to the respective first and second binary signals.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one form, the invention provides a system for determining a position of a rotational part in a reciprocating machine such as engine of a vehicle. The system includes a quadrature encoder and an interrupter coupled to the rotational element. As the interrupter rotates with the wrist pin, the quadrature encoder generates two binary signals based on the rotation of the wrist pin. A digital-to-analog converter then converts the binary signals into a single analog signal. The system then wirelessly transmits the single analog signal for processing by other remote components.

Figure 1:
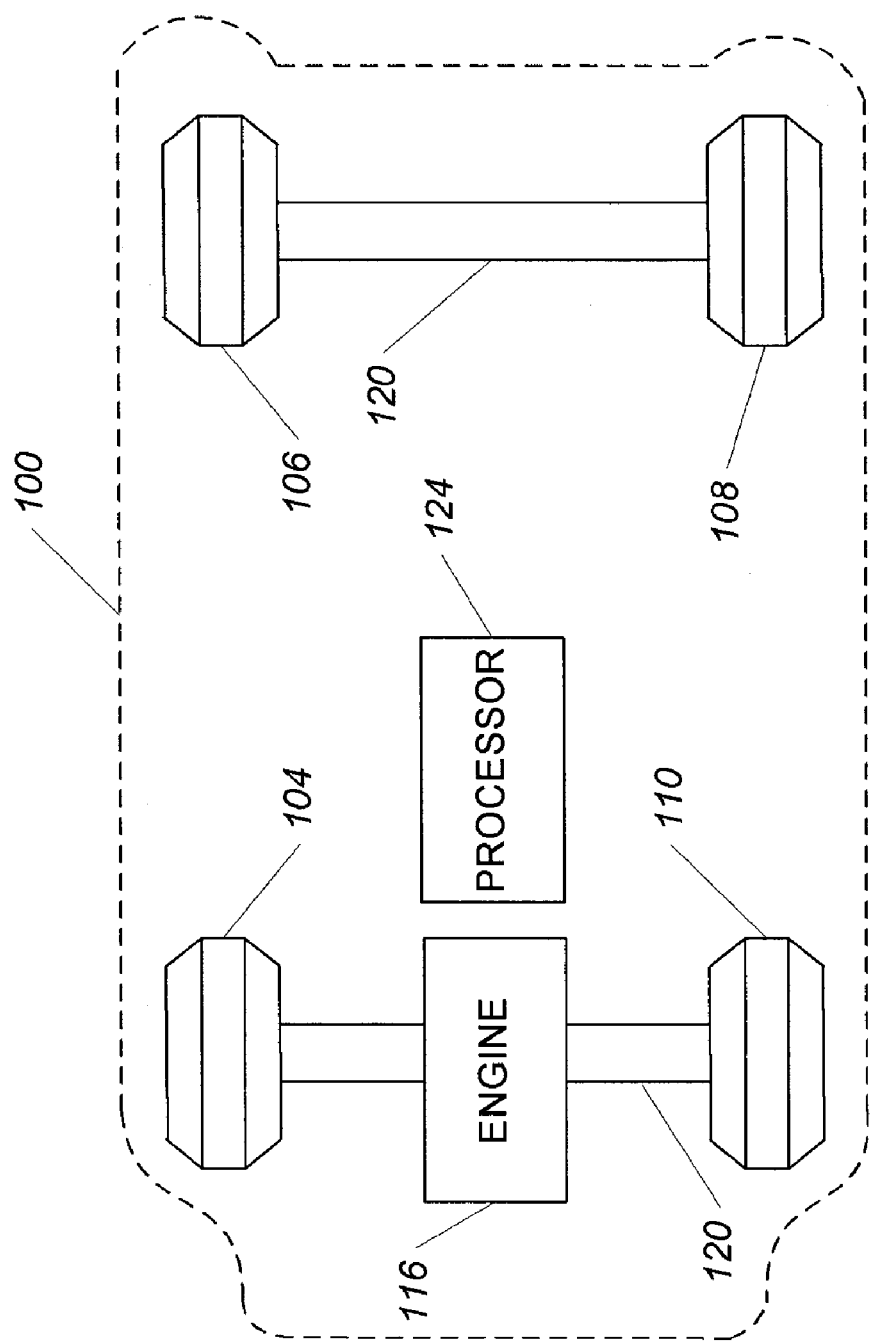
FIG. 1 shows a schematic plan view of an exemplary vehicle.

FIG. 1 shows a schematic plan view of an exemplary vehicle 100. The vehicle 100 has four wheels 104, 106, 108, and 110. A reciprocating machine such an engine 116 and associated axles 120 drive the wheels 104, and 110. The vehicle 100 also includes a processor 124 to receive signals from the engine 116 for processing. Exemplary vehicles include, but not limited to, automobiles, tractors, skid loaders, excavators, and the like. In some cases, some or all of the wheels 104, 106, 108, and 110 will drive a track. In other cases, the vehicle 100 will have more or fewer wheels. Although the illustrated embodiments contemplates application of the invention to an internal combustion engine of a vehicle, the invention may also be applied to substantially other systems that include a reciprocating machine.

Figure 2:
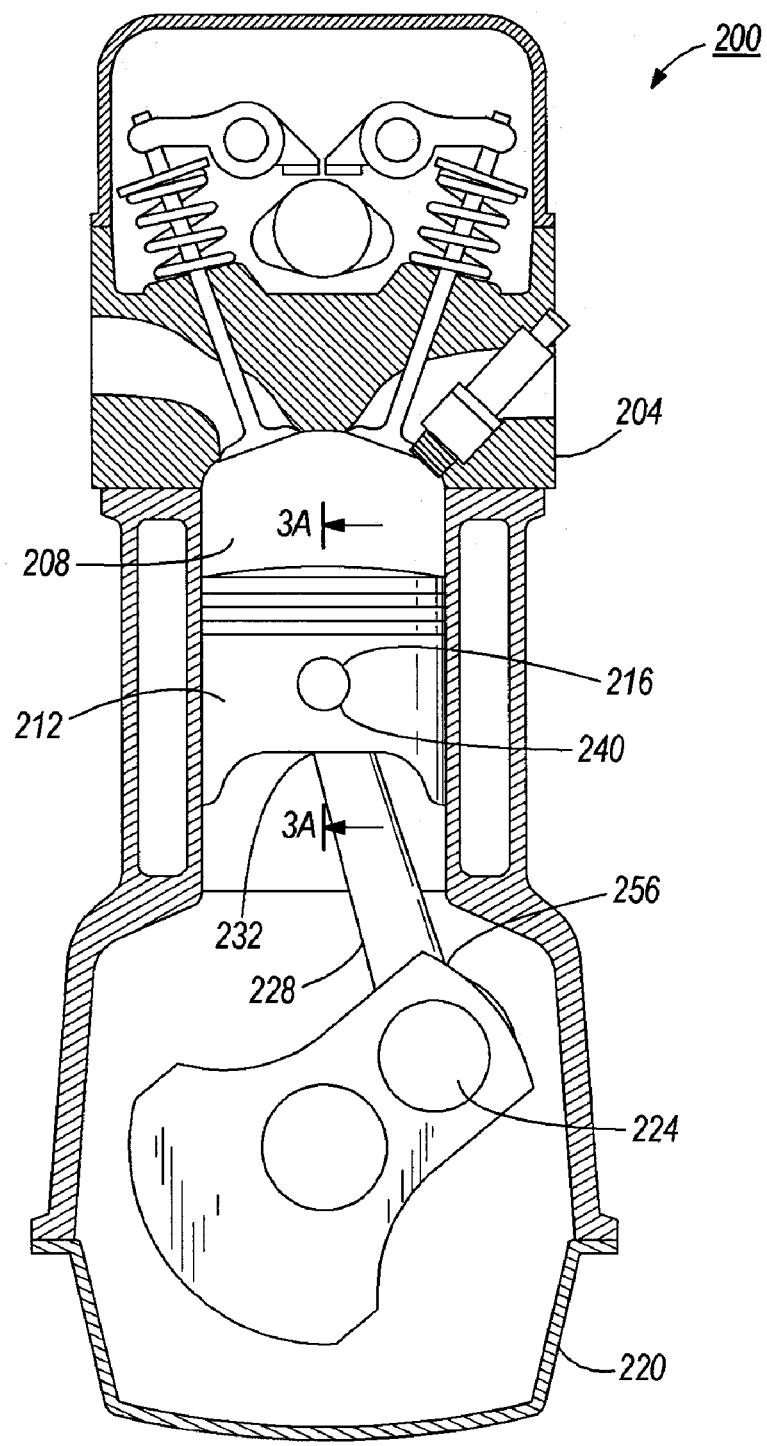
FIG. 2 shows a partial sectional view of an exemplary engine that can be used with the vehicle of FIG. 1.

FIG. 2 shows a partial sectional view of an exemplary engine 200 (116 of FIG. 1) that can be used with the vehicle 100 of FIG. 1. The engine 200 includes a cylinder 204 that defines a bore 208, and a piston 212 that reciprocates within the bore 208 of the cylinder 204 and has a bearing surface 216. The engine 200 also includes a crank case 220, and a crankshaft 224 that is supported for rotation within the crank case 220. The engine 200 also includes a connecting rod 228 that has first and second ends 232, 256. The first end 232 is pivotally connected to a wrist pin 240, whereas the second end 256 is pivotally connected to the crankshaft 224. FIG. 2 illustrates portions of the engine 200, therefore relevant to embodiments of the invention. The engine 200 may include other parts (some of which are illustrated) such as intake valves, rocker arms and springs, valve covers, intake ports, an oil pan, an oil sump, camshafts, exhaust valves, spark plugs, exhaust ports, and the like. Although the illustrated embodiment contemplates application of the invention to an internal combustion engine, the invention may be applied to substantially any reciprocating machine that includes parts that may rotate. Exemplary reciprocating machines include compressors, air motors, steam engines, pump motors, external combustion engines, and the like.

Figure 3A:
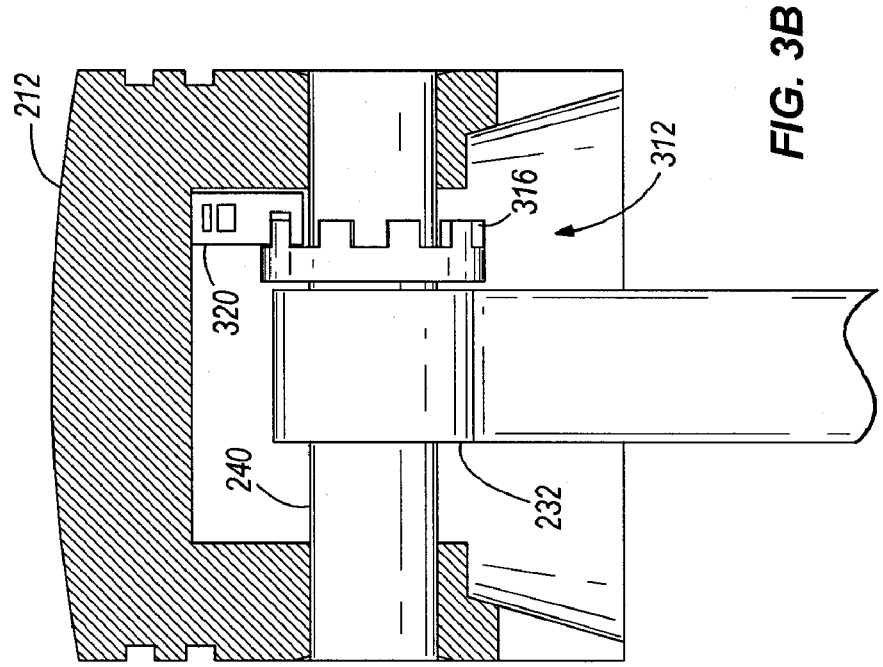
FIG. 3A shows a partial sectional view of a piston of the engine of FIG. 2 with a monitoring system according to one embodiment of the invention.
Figure 3B:
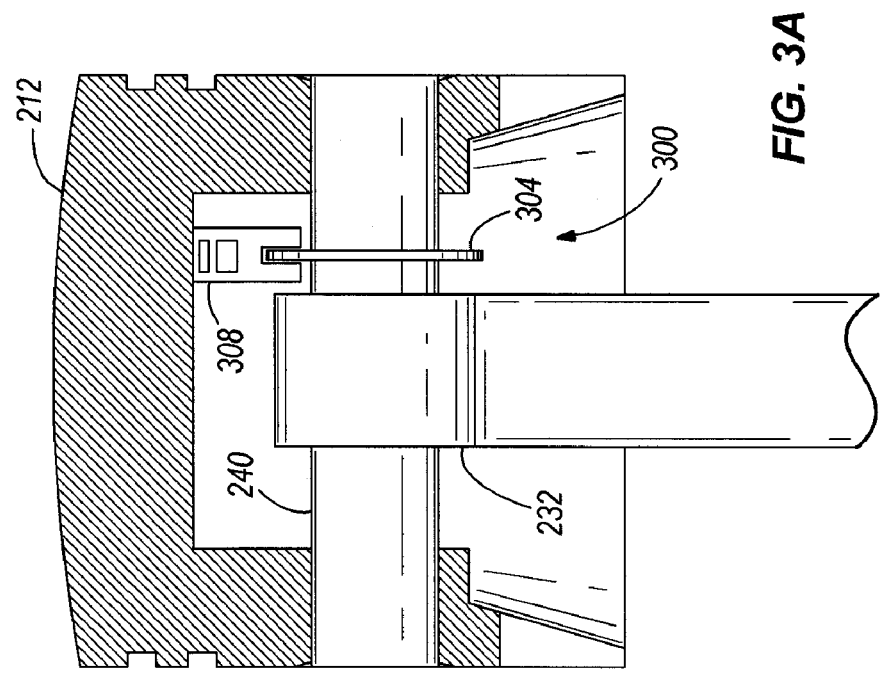
FIG. 3B shows a partial sectional view of a piston of the engine of FIG. 2 with an alternate monitoring system according to one embodiment of the invention.

FIG. 3A shows a partial sectional view along line 3A of the piston 212 of the engine 200 in FIG. 2 having a monitoring system 300, wherein like numerals refer to like parts. A rotational element 304 is mounted on the wrist pin 240, such that the rotational element 304 and the wrist pin 240 can rotate simultaneously at a same speed (i.e. the wrist pin 240 and rotational element 304 are rotationally coupled). A monitoring circuit 308 is positioned in the piston 212, but decoupled from rotational movement of the wrist pin 240, to monitor the rotational element 304 as the wrist pin 240 rotates. It should be noted that the rotational element 304 and the monitoring circuit 308 can be positioned at other positions along the wrist pin 240. FIG. 3B shows a partial sectional view along line 3A of the piston 212 of the engine 200 of FIG. 2 and an alternate monitoring system 312. In the embodiment shown, the alternate monitoring system 312 includes a castle nut 316 at least partially covered by an alternate monitoring circuit 320. The castle nut 316 includes a plurality of slits, and solid portions or interrupters, to be monitored by the alternate monitoring circuit 320, detailed hereinafter. Similar to the rotational element 304 of FIG. 3A, the castle nut 316 is mounted on (rotationally coupled to) the wrist pin 240 to rotate simultaneously with the wrist pin 240, and can be positioned anywhere along the wrist pin 240. Furthermore, the systems 300, 312 can be used in any other environments such as turbines and vehicle transmission.

Figure 4:
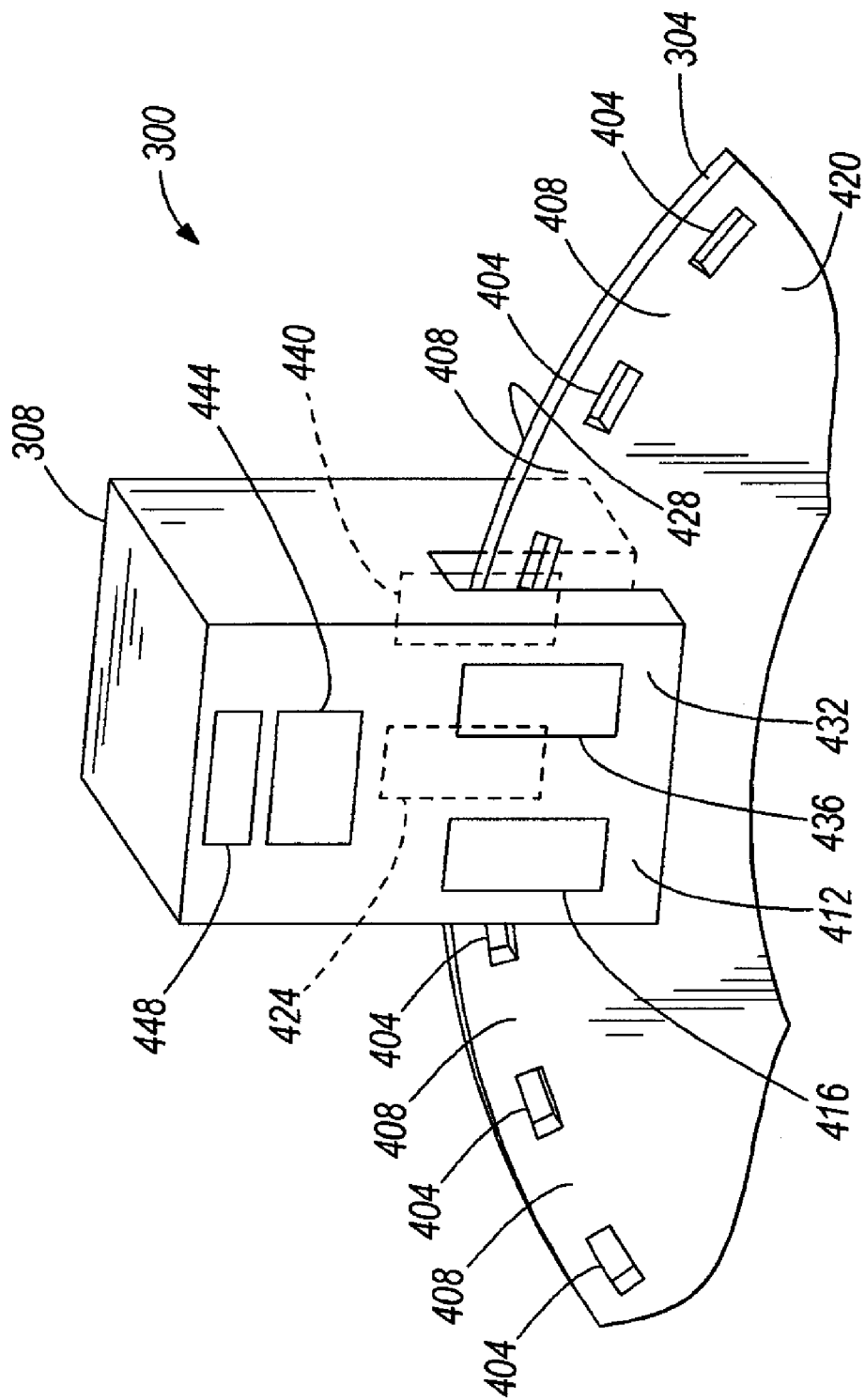
FIG. 4 shows a perspective view of the monitoring system of FIG. 3A.

FIG. 4 shows a perspective view of the monitoring system 300 of FIG. 3A, wherein like numerals refer to like parts. As shown, the rotational element 304 has a plurality of alternating slits 404 and solid portions 408. The monitoring circuit 308 includes a first binary signal generator 412 that includes a first optical signal emitter or generator 416 on one side 420 of the rotational element 304. In some embodiments, the first optical signal generator 416 continuously generates or emits an optical signal. The first binary signal generator 412 also includes a first optical signal pickup or receiver 424 that receives at least a portion of the emitted signals that pass through the slits 404. In the embodiment shown, the first optical signal receiver 424 is positioned on an opposite side 428 of the rotational element 304, and is aligned with the first optical signal generator 416 to capture at least a portion of the first emitted signals that pass through the slits 404. In some embodiments, the first binary signal generator 412 generates a first binary signal (which can be either a low signal or a high signal depending on the encoding scheme chosen) in response to the respective slits 404 and solid portions 408 of the rotational element 304 being positioned between the first optical signal generator 412 and the first optical signal receiver 424. Particularly, the first binary signal generator 412 is decoupled from the rotational movement of the wrist pin 204. In some embodiments, each of the slits 404 has a slit width that is about two or more times greater than an emitting width or a receiving width of the first optical receiver 424.

Similarly, the monitoring circuit 308 includes a second binary signal generator 432 that includes a second optical signal generator 436 on the one side 420 of the rotational element 304. In some embodiments, the second optical signal generator 436 continuously generates or emits an optical signal. The second binary signal generator 432 also includes a second optical signal receiver 440 that receives at least a portion of the second emitted signals that pass through the slits 404. In the embodiment shown, the second optical signal receiver 440 is positioned on the opposite side 428 of the rotational element 304, and is aligned with the second optical signal generator 436 to capture at least a portion of the second emitted signals that pass through the slits 404. In some embodiments, the second binary signal generator 432 generates a second binary signal that is high or low in value in response to the respective slits 404 and solids 408 of the rotational element 304 being positioned between the second optical signal generator 412 and the second optical signal receiver 440. Similarly, the second binary signal generator 432 is decoupled from the rotational movement of the wrist pin 204.

The binary signals generated by the respective first and second signal generators 412 and 432 are generally discrete or digital signals. The digital signals are further processed. For example, in the embodiment shown, the monitoring circuit 308 also includes a digital-to-analog converter ("DAC") 444 that converts the first and second binary signals from the first and second generators 412, 432 into a single analog signal. In some embodiments, when the first and second digital signals are both low, or both zeros ("00"), the DAC 444 generates a 0 v analog signal as an output. When the first and second digital signals are high and low, or one and zero ("10"), respectively, the DAC 444 generates a 1.25 v analog signal as the output. When the first and second digital signals are low and high, or zero and one ("01"), respectively, the DAC 444 generates a 2.5 v analog signal as the output. When the first and second digital signals are both high, or both ones ("11"), the DAC 444 generates a 3.75 v analog signal as the output. An exemplary DAC includes a resistor-ladder network such as a R2R resistor structure, or the like. In some embodiments, the monitoring circuit 308 also includes some signal conditioning circuits to condition the analog signal generated by the DAC 444.

An optional transmitter 448 then transmits the single analog signal to the processor 124 (of FIG. 1) for further processing. In some embodiments, the transmitter 448 wirelessly and selectively transmits each of the four possible analog signals at a corresponding frequency. For example, the optional transmitter 448 wirelessly transmits a 35 KHz analog signal when the output is 0 v. Similarly, the optional transmitter 448 wirelessly transmits a 40 KHz analog signal when the output is 1.25 v, a 45 KHz analog signal when the output is 2.5 v, and a 50 KHz analog signal when the output is 3.75 v, respectively. In such cases, the processor 124 (of FIG. 1) includes a receiver that wirelessly receives the transmitted signal. The transmitted signal can be corrupted or drift due to reasons such as engine noise. Accordingly, at the receiver, each of the four possible transmitted frequencies is considered a nominal frequency within an acceptable frequency range. For example, in some embodiments, signals having a frequency between 32.4 KHz and 37.5 KHz are considered as a 35 KHz signal. Similarly, signals having a frequency between 37.5 KHz and 42.7 KHz are considered as a 40 KHz signal, signals having a frequency between 42.7 KHz and 47.9 KHz are considered as a 45 KHz signal, and signals having a frequency between 47.9 KHz and 53.0 KHz are considered as a 50 KHz signal, respectively. It should be noted that other frequency ranges and nominal frequencies can also be used depending on applications and transmission requirements.

Once the transmitted signals have been received, and the corresponding nominal received frequencies of the received signals have been determined, the processor 124 (of FIG. 1) can determine a direction and speed at which the wrist pin 240 is spinning. For example, when the nominal received frequency increases from 35 kHz to 40 kHz, the wrist pin 240 is considered as rotating in reverse. Conversely, when the nominal received frequency decreases from 45 kHz to 50 kHz, the wrist pin 240 is considered as rotating forward. Depending on a time the received signal remain unchanged, a number of the slits 404 on the rotational element 304, the speed of the rotating wrist pin can also be determined in a known manner.

Figure 5:
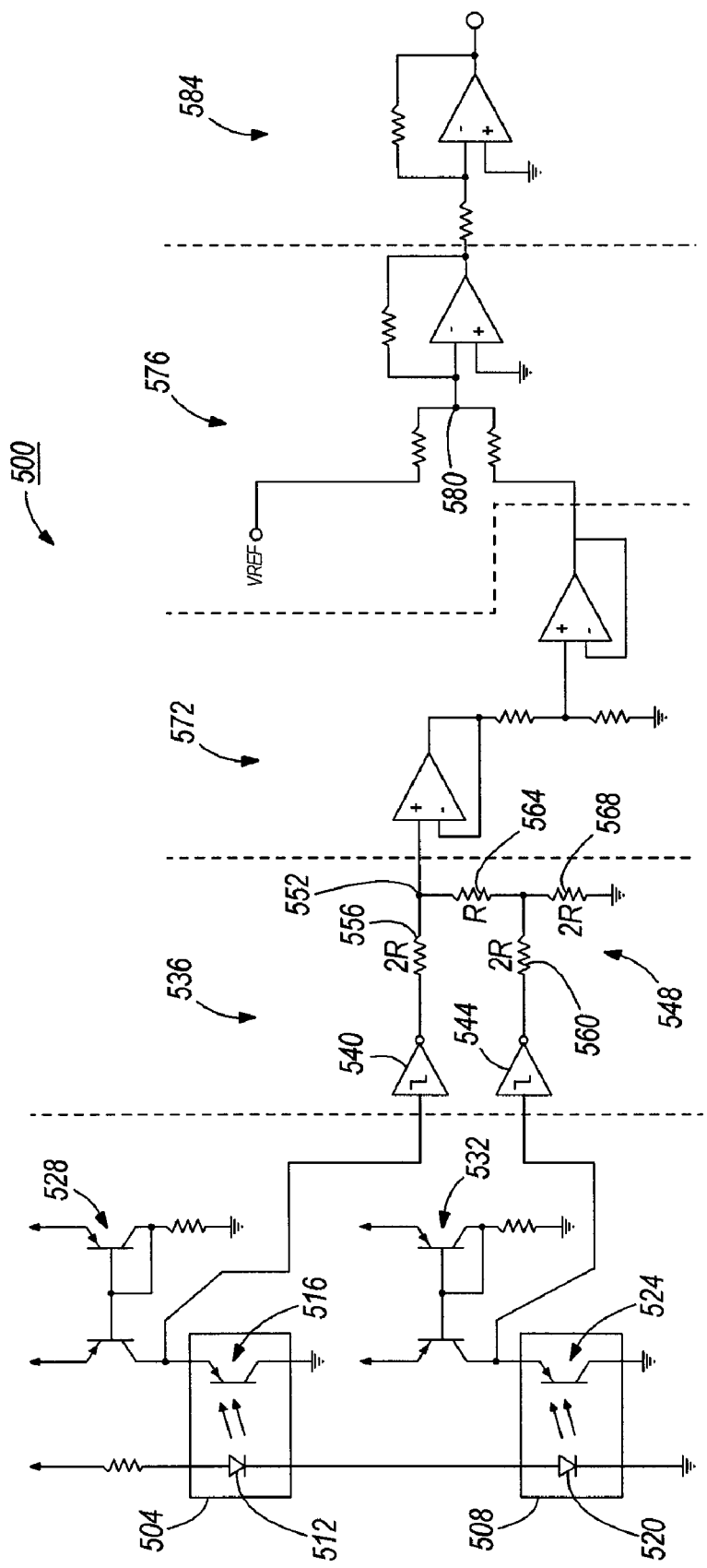
FIG. 5 shows a schematic view of an embodiment of a monitoring system.

FIG. 5 shows a schematic view of a specific embodiment of a monitoring circuit 500 (such as the monitoring circuit 308 of FIG. 3A) of the monitoring system 300 of FIG. 4A. The monitoring circuit 500 includes a pair of parallel first and second photo-interrupters 504, 508. The first interrupter 504 includes a first signal emitter 512 (412 of FIG. 4) that emits an optical signal, and a first signal detector 516 (424 of FIG. 4) that is aligned with the first signal emitter 512 and receives the optical signal when the rotational element 304 does not interrupt the optical signal with the solid portions 408 of FIG. 4. The first interrupter 504 typically has an interrupter gap between the first signal emitter 512 and first signal detector 516. The first signal detector 516 also has a receiver width that is less than half of the slit width of the rotational element 304 (of FIG. 4). Similarly, the second interrupter 508 includes a second signal emitter 520 (436 of FIG. 4) that emits a second optical signal, and a second signal detector 524 (440 of FIG. 4) that is aligned with the second signal emitter 520 and receives the second optical signal when the rotational element 304 does not interrupt the second optical signal with the solid portions 408 of FIG. 4. An exemplary photo-interrupter is a Sharp GP1S094HCZ0F compact transmissive photo-interrupter.

The monitoring circuit 500 also includes a pair of first and second current mirror circuits 528, 532. The current mirror circuits 528, 532 generates respective first and second binary output signals in response to the alternating slits 404 and solid portions 408 of the rotational element 304 interrupting the respective first and second optical signals. The first and second binary output signals are converted into a single analog signal with a digital-to-analog converter ("DAC") 536. Specifically, the DAC 536 buffers and inverts the first and second binary output signals with first and second inverting buffers 540, 544, respectively. A resistor ladder network 548 such as an R2R resistor structure 548 converts the buffered binary output signals into the single analog signal at node 552. The resistor ladder network 548, as shown, includes an R2R resistor structure. Particularly, the resistor ladder network 548 includes a first resistor 556 having a resistance of 2R to receive the first buffered binary signal, and a second resistor 560 having a resistance of 2R to receive the second buffered binary signal. Resistor 564 has a resistance of R and resistor 568 has a resistance of 2R. The resistors 564 and 568 divide the buffered binary signals. For example, when the buffered binary signals are voltage signals having high values of 5 v, resistors 564 and 568 divide the voltage signals and produce a single analog signal of 3.75 v at node 552.

In some embodiments, the single analog signal at node 552 is further conditioned in a signal conditioning circuit. In the embodiment shown, the single analog signal at node 552 is fed to an optional second buffer and voltage divider section 572 for further conditioning. Particularly, the voltage divider section 572 scales and shifts the single analog signal down such that the analog signal is suitable for telemetry purposes. A voltage summing section 576 then further conditions the scaled analog signal by adding an offset or a reference voltage, vref, to the scaled analog signal at node 580. Similarly, a gain section 584 amplifies the offset analog signal to within a predetermined voltage range, such as, for example 0-1.5 v, and prepares the amplified analog signal for wireless transmission.

Various features and advantages of the invention are set forth in the following claims.

The invention claimed is:

1. A reciprocating machine comprising:
   a crank case;
   a crankshaft supported for rotation within the crank case;
   a cylinder defining a bore;
   a piston reciprocable within the bore of the cylinder, the piston having at least one bearing surface;
   a wrist pin supported by the at least one bearing surface;
   a connecting rod having a first end pivotally connected to the crankshaft and a second end pivotally connected to the wrist pin to convert reciprocal movement of the piston into rotation movement of the crankshaft;
   a rotational element having alternating slits and solid portions and being rotationally coupled to the wrist pin;
   a first binary signal generator including a first optical signal generator on one side of the rotational element and a first optical signal receiver on an opposite side of the rotational element and aligned with the first optical signal generator, such that the first binary signal generator generates a first binary signal in response to respective slits and solids of the rotational element being positioned between the first optical signal generator and the first optical signal receiver, the first binary signal generator being decoupled from rotational movement with the wrist pin;

a second binary signal generator including a second optical signal generator on the one side of the rotational element and a second optical signal receiver on the opposite side of the rotational element and aligned with the second optical signal generator, such that the second binary signal generator generates a second binary signal in response to respective slits and solids of the rotational element being positioned between the second optical signal generator and the second optical signal receiver, the second binary signal generator being decoupled from rotational movement with the wrist pin; and a circuit configured to receive the first and second binary signals and convert the first and second binary signals into a single analog signal, wherein the first and second binary signals provide a first digit and a second digit in a two-digit binary signal that is converted to the single analog signal.

2. The machine of claim 1, wherein the circuit comprises a transmitter wirelessly transmitting the single analog signal.

3. The machine of claim 1, wherein further comprising a processor receiving the transmitted signal and processing the received signal.

4. The machine of claim 1, wherein the circuit comprises a digital-to-analog converter converting the two-digit binary signal into the single analog signal.

5. The machine of claim 1, wherein each of the first and second optical signal receivers has a receiving width, wherein each of the slits has a slit width, and wherein the slit width is greater than the receiving width.

6. The machine of claim 1, wherein the circuit comprises a resistor ladder network.

7. The machine of claim 1, wherein the rotational element comprises a castle nut.

8. A method for determining a position of a rotational element having alternating slits and solids, the method comprising:

generating a first optical signal at a first position on one side of the rotational element;

receiving at least a portion of the first optical signal at a first position on an opposite side of the rotational element in response to the respective slits and solids of the rotational element;

generating a first binary signal in response to the received first signal;

generating a second optical signal at a second position on the one side of the rotational element;

receiving at least a portion of the second optical signal at a second position on the opposite side of the rotational element in response to the respective slits and solids of the rotational element;

generating a second binary signal in response to the received second signal; and converting the first and second binary signals into a single analog signal, wherein the first and second binary signals provide a first digit and a second digit in a two-digit binary signal that is converted to the single analog signal.

9. The method of claim 8, further comprising wirelessly transmitting the single analog signal.

10. The method of claim 9, further comprising wirelessly receiving the transmitted signal remotely.

11. The method of claim 8, wherein receiving at least a portion of the second optical signal comprises receiving the at least a portion of the second optical signal within a receiving width, wherein each of the slits has a slit width, and wherein the slit width is greater than the receiving width.

12. The method of claim 8, wherein converting the first and second binary signals comprises converting the first and second binary signals into the single analog signal using a resistor ladder network.

13. The method of claim 8, wherein the rotational element comprises a castle nut.

14. A method for sensing a position of a wrist pin rotationally coupled to a rotational element having a plurality of apertures, the method comprising:

emitting first and second signals from one side of the rotational element;

receiving at least a portion of the respective first and second signals through the apertures on an opposite side of the rotational element;

generating respective first and second binary signals in response to the received first and second signals; and generating a single analog signal in response to the respective first and second binary signals, wherein the first and second binary signals provide a first digit and a second digit in a two-digit binary signal that is converted to the single analog signal.

15. The method of claim 14, further comprising wirelessly transmitting the single analog signal.

16. The method of claim 15, further comprising wirelessly receiving the transmitted signal remotely.

17. The method of claim 14, wherein receiving at least a portion of the respective first and second signals comprises receiving at least a portion of the respective first and second signals within a receiving width, wherein each of the apertures has an aperture width, and wherein the aperture width is greater than the receiving width.

18. The method of claim 14, wherein generating a single analog signal comprises converting the first and second binary signals into the single analog signal using a resistor ladder network.

19. The method of claim 14, wherein the rotational element comprises a castle nut.

* * * * *